United States Patent [19]

Palagos

[11] 3,982,951

[45] Sept. 28, 1976

[54] ALUMINUM CHROMATE PROTECTIVE COATINGS FOR ALUMINUM

[75] Inventor: Miguel Coll Palagos, Rye, N.Y.

[73] Assignee: Stauffer Chemical Company, Westport, Conn.

[22] Filed: Apr. 20, 1973

[21] Appl. No.: 353,159

Related U.S. Application Data

[63] Continuation of Ser. No. 181,207, Sept. 16, 1971, abandoned.

[52] U.S. Cl. .................................. 106/14; 148/6.2; 148/6.27; 252/387
[51] Int. Cl.² ........................................ C09D 5/08
[58] Field of Search ............. 106/14; 148/6.2, 6.27; 252/387

[56] References Cited

UNITED STATES PATENTS

| | | | |
|---|---|---|---|
| 2,276,353 | 3/1942 | Thompson | 148/6.2 |
| 2,868,679 | 1/1959 | Pimbley | 148/6.2 |

*Primary Examiner*—Lorenzo B. Hayes
*Attorney, Agent, or Firm*—Paul J. Juettner

[57] ABSTRACT

A corrosion resistant conversion coating consisting essentially of hexavalent chromium, fluosilicate ion, nitrate ion, and a source of soluble barium. Improved paintability and corrosion resistance of the aluminum surface is claimed adapting the aluminum for siding and other architectural uses.

5 Claims, No Drawings

ALUMINUM CHROMATE PROTECTIVE COATINGS FOR ALUMINUM

This is a continuation of application Ser. No. 181,207, filed Sept. 16, 1971, now abandoned.

BACKGROUND OF THE INVENTION

The present invention relates to chromate conversion coatings to be applied to aluminum surfaces to provide a corrosion resistant coating thereon. The coating formed is also especially useful in forming an improved bond for organic finishes such as paints, lacquers, and the like, when desired.

Chromate conversion coatings are well known in the prior art. Numerous ions have been utilized in the preparation of these chromate coatings in addition to the chromium ion. The average composition which is utilized provides coatings which, in general, are highly colored in the nature of yellow, brown, or blue. When it is desired to apply paint to these surfaces, it is extremely disadvantageous to have the highly yellow color, particularly when a pastel paint is used since a greater quantity of paint must be used to overcome the underlying color.

It has now been found that a clear chromate conversion coating can be provided which will also provide the corrosion resistance necessary in protecting aluminum in situations where the surface is to be painted.

THE INVENTION

In accordance with the present invention there is provided a chromate conversion coating for aluminum comprising chromate ions, barium ions, nitrate ions, and fluosilicate ions. It has been found that this combination will provide a chromate conversion coating which is clear and which will withstand the type 2 military specifications of 336 hours under salt spray without corrosion. The conversion coating is applicable to the metal at room temperature at a pH of 1.2 1.6 in a rapid manner of about 1 minute.

The solution of the present invention is prepared by dissolving in water a composition including a hexavalent chromium compound such as chromium trioxide, a chromate or di-chromate such as sodium potassium chromate or di-chromate, and, preferably, the chromium trioxide. The chromium compound is preferably used in an amount sufficient to provide approximately 2.5 to about 3.75 grams per liter of hexavalent chromium ion. Using the preferred chromium trioxide, the preferred solution contains 6 grams per liter of chromium trioxide which provides approximately 3.12 grams per liter hexavalent chromium ion.

In addition to the chromium ion, the solution also contains nitrate ion which is preferably added in the form of barium nitrate though other nitrate compounds and nitric acid can also be utilized. The preferred compound, barium nitrate, is preferably used in an amount of from about 1.5 to 2.5 grams per liter thereby providing 0.71 to 1.19 grams per liter nitrate ion. At the preferred level of 2 grams per liter barium nitrate, there is provided 0.95 grams per liter nitrate ion. The equivalent barium content ranges from 0.79 grams per liter for the 1.5 grams per liter barium nitrate to approximately 1.3 grams per liter using the 2.5 grams per liter barium nitrate. The preferred composition using 2 grams per liter barium nitrate provides approximately 1 gram per liter barium ion.

The third component of the composition is a fluosilicic acid, and salts thereof, notably barium, sodium, and potassium fluosilicates. The fluosilicate ion is perfectly added as a sodium salt in an amount ranging from 0.75 grams per liter to about 1.5 grams per liter, and preferably approximately 1 gram per liter. Utilizing the preferred sodium fluosilicate, 1 gram per liter of fluosilicate ion is provided by 1.4 grams per liter sodium fluosilicate.

The composition of the present invention can be provided as liquid solution or as a dry mixture which can be made up into a suitable bath by the addition of water, or it may be supplied as a concentrated aqueous solution which may be diluted by the consumer. The coating solution can be effectively applied to the aluminum surfaces by dip, brush, or spray, with a solution as described hereinbefore. Methods of application of chromate coatings are well known and need no further illustration.

The aluminum or aluminum alloy articles to be coated are first, preferably, cleaned by conventional methods to remove organic matter and metallic oxides. The so cleaned surface can then be subjected to the dipping, brushing, or spraying step using the aqueous solution set forth hereinbefore.

The solutions set forth in the present invention are generally applied at room temperature though temperatures of up to approximately 90°F. can be used if desired.

It is extremely critical that the pH of the solution be controlled in order to provide effective results. pH's within the range of 1.2 to 1.6 are required for effective application of chromate conversion coatings.

The contact time of the solution with the aluminum has some relationship to the overall characteristics of the final product. The present invention will provide effective clear coatings after approximately 1 minute immersion time. Shorter or longer times may be utilized as required to effect different characteristics in the coating. The coating time is preferably limited between one-half minute and a minute and a half.

The conversion coatings provided in the present invention can be effectively used as a sub-coating for aluminum which is to be subsequently finished with an organic finish such as a paint or lacquer. Excellent bonding power is provided in addition to the excellent corrosion resistance.

The present invention will be further illustrated in the example which follows.

EXAMPLE 1

A chromate conversion coating was prepared utilizing 6 grams per liter chromium trioxide, 2 grams per liter barium nitrate, and 1.4 grams per liter sodium fluosilicate. The solution was applied to aluminum alloys numbers 6063 and 7075 which are normally used in architectural applications. The immersion time was one minute at a temperature of 24°C. and the coating was conducted at a pH of 1.3–1.4. The so coated aluminum was subjected to a 5% salt spray corrosion test in accordance with military specifications, MIL-C-5541A. 336 hours of spray testing are required to pass this military specification test, and at the end of 336 hours, no corrosion was observed. The color of the coating was clear. A similar sample coated with a composition prepared in accordance with U.S. Pat. No. 2,796,371, example 10, using the following formulation of 6 grams per liter chromium trioxide, 2 grams per liter barium nitrate, 1 gram per liter potassium ferricyanide and 1.4 grams per liter sodium fluosilicate under the previously indicated conditions provided similar results in the salt-spray corrosion test, but the coating was an extremely highly yellow.

The compositions of the present invention are also applicable to other aluminum alloys, such as 3003, which is approximately the same as 6065 and which is commonly used in preparing aluminum siding for houses with equal effectiveness.

The invention is further defined in the claims which follow.

What is claimed is:

1. A composition for use in aqueous solution to impart a colorless corrosion resistant coating to aluminum and alloys thereof in which said composition consists essentially of hexavalent chromium, a fluosilicate ion, a nitrate ion, and a source of soluble barium in such amounts that when added to one liter of water there is provided about 2.5 to about 3.75 grams per liter hexavalent chromium, from about 0.75 to about 1.5 grams per liter fluosilicate ion, from about 0.71 to about 1.19 grams per liter nitrate ion, and from about 0.79 to about 1.3 grams per liter barium ion.

2. An aqueous solution to impart a corrosion resistant coating to aluminum which is clear which consists essentially of from 5 to 7 grams per liter chromium trioxide, 1.5 to 2.5 grams per liter barium nitrate and 1 to 2 grams, per liter, sodium fluosilicate.

3. The composition as recited in claim 2 wherein the chromium trioxide is present in the amount of 6 grams per liter.

4. The composition as recited in claim 2 wherein the barium nitrate is present in the amount of 2 grams per liter.

5. The composition as recited in claim 2 wherein the sodium fluosilicate is present in an amount of 1.4 grams per liter.

* * * * *